United States Patent [19]

Abhau

[11] Patent Number: 5,948,867
[45] Date of Patent: Sep. 7, 1999

[54] POLYOLEFIN COMPOSITIONS USED FOR MAKING EMBOSSED SHEETS WITH IMPROVED GAIN RETENTION

[75] Inventor: Cheryl L. Abhau, Pennsville, N.J.

[73] Assignee: Montell Technology Company bv, Netherlands

[21] Appl. No.: 09/177,769

[22] Filed: Oct. 23, 1998

Related U.S. Application Data

[63] Continuation of application No. 08/757,014, Nov. 26, 1996, abandoned.

[51] Int. Cl.⁶ .......................... C08L 23/12; C08L 23/16; C08L 23/26
[52] U.S. Cl. ........................ 525/194; 525/211; 525/232; 525/237; 525/240
[58] Field of Search ................................. 525/211, 240, 525/232, 194, 237

[56] References Cited

U.S. PATENT DOCUMENTS

| | | | |
|---|---|---|---|
| 4,966,944 | 10/1990 | Kiang | 525/194 |
| 5,143,978 | 9/1992 | Berta | 525/240 |
| 5,338,801 | 8/1994 | Eppert, Jr. | 525/232 |

Primary Examiner—Donald R. Wilson

[57] ABSTRACT

Embossed sheets having improved grain retention can be made from a polyolefin composition containing a propylene polymer material and a partially crosslinked thermoplastic olefin elastomer composition that includes (1) 20–80 parts by weight of a thermoplastic elastomer containing (a) from 20 to 70% of a propylene homopolymer having an isotactic index greater than 90, or a crystalline propylene copolymer with ethylene and/or a 4–8 C alpha-olefin having a polymerized propylene content greater than 85% and an isotactic index of greater than 85%; (b) from 30 to 75% of an amorphous ethylene-propylene or ethylene-butane-1 copolymer, which is xylene soluble at room temperature and contains from 30 to 70% polymerized ethylene, and (c) from 3 to 30% of a semi-crystalline ethylene-propylene or ethylene-butene-1 copolymer that is xylene insoluble at room temperature and contains greater than 90% polymerized ethylene, and (2) 80-20 parts by weight of an ethylene/propylene/diene terpolymer rubber containing 1 to 10% of a polymerized diene and 30 to 70% polymerized ethylene. Large parts such as automobile door and instrument panels can be formed from these sheets.

4 Claims, No Drawings

POLYOLEFIN COMPOSITIONS USED FOR MAKING EMBOSSED SHEETS WITH IMPROVED GAIN RETENTION

This application is a continuation of Ser. No. 08/757,014 filed Nov. 26, 1996, now abandoned.

FIELD OF THE INVENTION

This invention relates to a polyolefin composition comprising (A) a propylene polymer material and (B) a partially crosslinked thermoplastic olefin elastomer composition.

BACKGROUND OF THE INVENTION

With advances in polyolefin technology, the use of polypropylene materials, particularly thermoplastic olefin materials (TPOs), in automotive applications has increased dramatically, replacing nonolefin materials such as acrylonitrile/butadiene/styrene terpolymer, polyvinyl chloride, and polycarbonate. Thermoplastic olefins are uncrosslinked blends of olefin polymers and polyolefin elastomers. New reactor product TPOs are finding use in areas such as interior trim (e.g., dashboards and door panels) due to their soft feel, thermoformability, and resistance to ultraviolet light and heat.

The process of producing these parts involves the following steps: (a) extrusion or calendering of the TPO sheet, (b) embossing (on- or off-line) of the extruded or calendered sheet to produce a textured or "grained" surface, (c) laminating and/or bonding extruded or calendered sheet to a foam or fabric for softness, (d) topcoating or painting the sheet for UV, scratch and mar resistance, and (e) forming the final part or other article from the sheet by thermoforming or low pressure injection molding.

U.S. Pat. No. 5,338,801 describes a polyolefin composition comprising (A) 70 to 90% of a propylene polymer material and (B) 30 to 10% of an olefin polymer material selected from the group consisting of (1) a partially crosslinked thermoplastic olefin elastomer composition consisting of a thermoplastic elastomer and an olefin rubber composition, (2) an uncrosslinked ethylene-propylene-conjugated diene terpolymer rubber, and (3) mixtures of (B)(1) and (B)(2). The composition provides low gloss after processing with retention of physical and mechanical properties.

A major drawback of TPOs has been their inability to retain embossed grain after the sheet is thermoformed into a large part such as a dashboard. The low melt strength and shear thinning that are typical of TPOs result in loss of the textured surface and walls that are too thin when the TPOs are formed into parts or other articles.

SUMMARY OF THE INVENTION

The polyolefin composition of this invention comprises, by weight, (A) from 40 to 70% of a propylene polymer material consisting essentially of:
(1) from 10 to 50% of a propylene homopolymer having an isotactic index of about 80 to about 99%, or a copolymer selected from the group consisting of (a) propylene and ethylene, (b) propylene, ethylene and a $CH_2=CHR$ alpha-olefin, where R is a $C_{2-8}$ straight or branched alkyl group, and (c) propylene and an alpha-olefin as defined above in (1)(b), the copolymer containing from 85 to 99% propylene and having an isotactic index greater than 80 to about 98%, (2) from 3 to 20% of a semi-crystalline, essentially linear copolymer fraction having a crystallinity of about 20 to about 60% by differential scanning calorimetry (DSC), wherein the copolymer is selected from the group consisting of (a) ethylene and propylene containing over 50% ethylene; (b) ethylene, propylene, and an alpha-olefin as defined above in (1)(b), containing from 1 to 10% of the alpha-olefin and over 50% up to 98% of both ethylene and alpha-olefin; and (c) ethylene and an alpha-olefin as defined in (1)(b) containing over 50% up to 98% of the alpha-olefin, which copolymer is insoluble in xylene at room or ambient temperature, and (3) from 40 to 80% of a copolymer fraction selected from the group consisting of a copolymer of (a) ethylene and propylene, wherein the copolymer contains from 20% to less than 40% ethylene; (b) ethylene, propylene, and an alpha-olefin as defined in (1)(b), wherein the alpha-olefin is present in an amount of from 1 to 10%, and the amount of ethylene and alpha-olefin present is from 20% to less than 40%; and (c) ethylene and an alpha-olefin as defined in (1)(b), containing from 20 to less than 40% of the alpha-olefin, and optionally containing 0.5 to 10% of a diene, the copolymer fraction (3) being soluble in xylene at ambient temperature, and having an intrinsic viscosity of from 1.7 to 3.0 dl/g, wherein the total amount of fractions (2) and (3), based on the total olefin polymer composition is from about 65% to 80%, the weight ratio of fractions (2)/(3) is from 0.1 to about 0.3, and the total content of ethylene or $C_{4-8}$ alpha-olefin or combination thereof in fractions (2)+(3) is less than 50%, and (B) from 60 to 30% of a partially crosslinked thermoplastic olefin elastomer composition consisting essentially of:
(1) 20–80 parts by weight of a thermoplastic elastomer consisting essentially of:
(a) from 20 to 70% of a propylene homopolymer having an isotactic index greater than 90, or a crystalline propylene copolymer with ethylene and/or a $C_{4-8}$ alpha-olefin having a propylene content greater than 85% and an isotactic index of greater than 85%;
(b) from 30 to 75% of an amorphous ethylene-propylene or ethylene-butene copolymer fraction, optionally containing from 1 to 10% of a diene, which is xylene soluble at room temperature and contains from 30 to 70% ethylene, and
(c) from 3 to 30% of a semi-crystalline ethylene-propylene or ethylene-butene copolymer that is xylene insoluble at room temperature and contains greater than 90% ethylene, and
(2) 80-20 parts by weight of an ethylene/propylene/diene terpolymer rubber containing 1 to 10% of a diene and 30 to 70% ethylene.

The addition of the partially crosslinked TPO elastomer composition to the propylene polymer material produces sheet materials exhibiting significant improvement in grain retention and reduction in shear thinning. Large parts such as automobile door and instrument panels can be formed from these sheets.

DETAILED DESCRIPTION OF THE INVENTION

All parts and percentages used in this specification are by weight unless otherwise specified. Ambient or room temperature is approximately 25° C.

Component (A) used in the composition of the present invention is a propylene polymer material consisting essentially of:

(1) from 10 to 50% of a propylene homopolymer, preferably from 10 to 40%, and most preferably from 20 to 35%, having an isotactic index of about 80 to about 99%, and preferably from 85 to 99%, or a copolymer selected from the group consisting of (a) propylene and ethylene, (b) propylene, ethylene and a $CH_2=CHR$ alpha-olefin, where R is a $C_{2-8}$ straight or branched alkyl group, and (c) propylene and an alpha-olefin as defined above in (1)(b), wherein the copolymer contains from 85 to 99%, and preferably from 90 to 99% propylene and has an isotactic index greater than 80 to 98%, preferably greater than 85 to about 98%, (2) from 3 to 20% of a semi-crystalline, essentially linear copolymer fraction, preferably from 7 to 15%, having a crystallinity of about 20 to about 60%, by differential scanning calorimetry (DSC), wherein the copolymer is selected from the group consisting of (a) ethylene and propylene containing over 50% ethylene; (b) ethylene, propylene, and an alpha-olefin as defined above in (1)(b), containing from 1 to 10% of the alpha-olefin and over 50% up to 98%, preferably from 80 to 95%, of both ethylene and alpha-olefin; and (c) ethylene and an alpha-olefin as defined in (1)(b), containing over 50% up to 98%, preferably from 80 to 95%, of the alpha-olefin, which copolymer is insoluble in xylene at room or ambient temperature, and (3) from 40 to 80% of a copolymer fraction, preferably 50 to 70%, selected from the group consisting of a copolymer of (a) ethylene and propylene wherein the copolymer contains from 20% to less than 40%, preferably from 20 to 38%, most preferably 25 to 38% ethylene, (b) ethylene, propylene, and an alpha-olefin as defined in (1)(b), wherein the alpha-olefin is present in an amount of from 1 to 10%, preferably from 1 to 5%, and the amount of ethylene and alpha-olefin present is from 20% to less than 40%, and (c) ethylene and an alpha-olefin as defined in (1)(b), containing from 20 to less than 40%, preferably 20 to 38%, and most preferably 25 to 38% of the alpha-olefin, and optionally containing 0.5 to 10%, preferably 1 to 5%, of a diene, the copolymer fraction (3) being soluble in xylene at ambient temperature, and having an intrinsic viscosity measured in tetrahydronaphthalene at 135° C. preferably of from 1.7 to 3.0 dl/g, wherein the total amount of ethylene units or the alpha-olefin units in the olefin polymer composition or of ethylene and the alpha-olefin units when both are present in the olefin polymer composition is from 15 to 35%, the total amount of fractions (2) and (3), based on the total olefin polymer composition is preferably from about 65% to 80%, the weight ratio of fractions (2)/(3) is preferably from 0.1 to about 0.3 and the total content of ethylene or $C_{4-8}$ alpha-olefin or combination thereof in fractions (2)+(3) is less than 50%, and preferably from 20 to 45%.

The propylene polymer material of component (A) has at least one melt peak, determined by DSC, present at temperatures higher than 120° C., and at least one peak, relative to the vitreous transition, present at temperatures from −10° C. and −35° C. In addition, these materials have a flexural modulus of less than 150 MPa, generally from 20 and 100 MPa; a tensile strength at yield of from 10 to 20 MPa; elongation at break over 400%; a tension set, at 75% strain, from 20% to 50%; a Shore D hardness from 20 to 35; a haze value of less than 40%, preferably less than 35%, and do not break (no bridle impact failure) when an Izod impact test is conducted at −50° C. Component (A) is present in an amount of from 60 to 40%, preferably 50 to 40%, of the total composition.

Component (A) can be prepared by a polymerization process comprising at least two stages, where in the first stage the propylene, or propylene and ethylene or the alpha-olefin, or propylene, ethylene and alpha-olefin are polymerized to form component (A)(1), and in the following stages the mixtures of ethylene and propylene or alpha-olefin, or propylene, ethylene and alpha-olefin, and optionally a diene, are polymerized to form components (2) and (3).

The polymerization can be conducted in the liquid phase, gas phase, or liquid-gas phase using separate reactors, all of which can be done either by batch or continuously. For example, it is possible to carry out the polymerization of component (A)(1) using liquid propylene as a diluent, and the polymerization of components (2) and (3) in the gas phase, without intermediate stages except for the partial degassing of the propylene. The preparation of the propylene polymer material is described in more detail in U.S. Pat. No. 5,212,246, the process of which is incorporated herein by reference.

Component (B) of the present invention is a partially crosslinked thermoplastic olefin elastomer composition consisting essentially of:

(1) 20–80 parts by weight of a thermoplastic elastomer composition consisting essentially of:
  (a) from 20 to 70%, preferably from 20 to 50%, of a propylene homopolymer having an isotactic index greater than 90, preferably greater than 98%, or a crystalline propylene copolymer with ethylene and/or a $C_{4-8}$ alpha-olefin having a propylene content greater than 85% and an isotactic index of greater than 85%,
  (b) from 30 to 75%, preferably from 30 to 50%, of an amorphous ethylene-propylene or ethylene-butene copolymer fraction, optionally containing from 1 to 10%, preferably 1–5%, of a diene, that is xylene soluble at room temperature and contains from 20 to 70% ethylene, and
  (c) from 3% to 30%, preferably from 5 to 20%, of a semi-crystalline ethylene-propylene or ethylene-butene copolymer that is xylene insoluble at room temperature and contains greater than 75% ethylene, preferably greater than 85%, and (2) 80-20 parts by weight of an ethylene/propylene/diene terpolymer rubber containing 1 to 10% diene and 30 to 70% ethylene.

In the compositions of the present invention component (B) is present in an amount of from 60 to 30%, preferably from 55 to 30%, and most preferably 50 to 30%.

The $C_4$–$C_{10}$ alpha-olefins useful in the preparation of components (A) and (B) of the polyolefin composition of this invention include butene-1; pentene-1; hexene-1; 4-methylpentene-1, and octene-1.

The diene, when present, is typically a butadiene; 1,4-hexadiene; 1,5-hexadiene, or ethylidenenorbornene.

Component (B) is prepared by adding a peroxide curing system comprising an organic peroxide and at least one crosslinking aid selected from poly(1,2-butadiene) and furan derivatives, to a mixture of components (B)(1)(a), (b), and (c) and (B)(2), and subjecting the mixture to curing conditions while masticating the mixture to bring about the desired dynamic partial cure.

Preferably components (B)(1)(a), (b) and (c) are formed in a reactor or series of reactors in at least two stages by first polymerizing propylene to form component (a) and then polymerizing ethylene and propylene or ethylene and butene in the presence of component (a) and the catalyst used in the first stage to form components (b) and (c). The polymerization can be conducted in the liquid or gas phase or in liquid-gas phase. In the alternative, components (a), (b), and (c) can each be prepared separately and then mixed by melt-kneading or melt blending.

The term "partially cured" means that the degree of curing, in terms of the gel content, is at least 80% and no more than 94% in cyclohexane. Preferably, the gel content is from 85 to 92%. Percent gel content is determined by soaking a weighed 1.5"×0.75"×0.080" test specimen in about 100 ml cyclohexane at about 23° C. for 48 hours, removing the sample and drying to constant weight (about 72 hours) in a vacuum oven at 80° C. The % gel is calculated as:

$$\% \text{ gel} = \frac{\text{Initial wt. of rubber} - \text{Wt. of rubber extracted}}{\text{Initial wt. of rubber in sample}} \times 100\%$$

The preparation of the partially cured thermoplastic elastomer is described in more detail in U.S. Pat. No. 5,196,462, the process of which is incorporated herein by reference.

The compounding or melt blending of components (A) and (B) of the present invention can be carried out on an open roll, in an internal mixer (Banbury or Haake mixers), and single-screw or twin-screw extruders.

The polyolefin composition of the present invention can also contain other conventional additives, for example, antioxidants, stabilizers, extender oils such as paraffinic and naphthenic oils, fillers such as $CaCO_3$, talc and zinc oxide, or flame retardants.

Evaluating grain retention is highly subjective, since there are no standardized tests to measure this property per se. The aesthetic appearance of the final part is presently the industry standard in determining specimen acceptability.

In order to evaluate the relative grain retention of olefin polymer materials, the appearance of thermoformed sample specimens prepared from embossed sheets when viewed with the naked eye was compared with the compression set value of the present industry standards, i.e, polyvinyl chloride (PVC) and blends of PVC and acrylonitrile/butadiene/styrene (ABS). Both PVC and PVC/ABS blends had good grain retention. Compression set measures the percentage to which a polymer remains compressed after compression under standard conditions, i.e., 22 hours @212° F. according to ASTM-395, Method B. For example, 100% compression set translates to a sample that when compressed remains 100% compressed and does not recover to its original dimensions. Conversely, a sample with 0% compression set rebounds to 100% of its initial dimensions. The lower the compression set value, the better a material retains its original shape. PVC had a compression set value of 80 and the PVC/ABS blend a value of 78. From a measurement of the compression set value of various materials it was concluded that a compression set value equal to or less than 85% would result in a material with acceptable grain retention in automotive parts.

EXAMPLE 1

This experiment demonstrates the effect on compression set value and grain retention when various amounts of a propylene polymer material and a partially crosslinked thermoplastic elastomer composition were blended together.

Each sample was compounded and pelletized on a 2½" (30:1 L/D) single screw extruder using a barrel temperature of 450–500° F. with resulting melt temperatures of 450 to 500° F. The screw was equipped with a mixing section to ensure adequate melt blending. The polymer pellets from the compounding step were subsequently formed into 0.040" flat sheets using a 1½" (30:1 L/D) single screw extruder equipped with a 9½" sheet die. Barrel temperatures ranged from 450 to 525° F. with resulting melt temperatures of 500–535° F.

Each sheet was embossed with an 18×16 square mesh screen using a heated Carver press. Upper and lower press platens were heated to 250° F. The screen pattern was embedded into the sheet using a force of 10 tons for 10 seconds.

The embossed sheet was formed into 3" diameter by 2" deep cylindrical cups using plug assist thermoforming. Both the plug and the mold were heated to 100° F. Thermoforming processing conditions were optimized for each sheet formulation so that a best-case comparison between each formulation could be made. Grain retention was determined by examining the embossed parts with the naked eye after thermoforming. Thermoformed parts for each formulation were compared side-by-side and ranked from best to worst, using retention of the embossed pattern and absence of wall thinning as the main criteria.

Component (A) was a composition comprising:

(1) 100 parts by weight of a propylene polymer material comprising (a) 33% propylene-ethylene random copolymer having an ethylene content of 3.3% and an isotactic index, defined as the xylene insoluble fraction, of 94, (b) 8.3% semi-crystalline ethylene-propylene copolymer fraction containing ~83% ethylene, and (c) 58.7% amorphous ethylene-propylene copolymer fraction containing ~22% ethylene, (2) 0.2 parts by weight of Tinuvin 123 stabilizer, commercially available from Ciba-Geigy, per hundred parts of the propylene polymer material (pph).

(3) 0.2 pph (2-(2-hydroxy-3,5-di-tert-amylphenyl)-2H-benzotriazole), (4) 0.2 pph Chimassorb 119 light stabilizer, commercially available from Ciba-Geigy, and (5) 0.2 pph Irganox B-225 antioxidant (2,2-bis[[3-[3,5-bis(1,1-dimethylethyl)-4-hydroxy-benzene propanoate and tris(2,4-di-tert-butylphenyl) phosphite as a 50/50 blend) commercially available from Ciba-Geigy.

Component (B) was a composition comprising:

(1) 42.6% of a thermoplastic elastomer consisting of (i) 35% of a propylene homopolymer having an isotactic index, defined as the xylene insoluble fraction, of 97.5, (ii) 6.9% of a semi-crystalline ethylene-propylene copolymer that is xylene insoluble at room temperature, (iii) 58.1% of an amorphous ethylene-propylene copolymer rubber that is xylene soluble at room temperature, (2) 18.65% of an ethylene/propylene/ethylidenenorbornene terpolymer rubber containing 69% ethylene and 4% ethylidenenorbornene, having a Mooney viscosity of 60 ML (1+4) at 125° C., commercially available from Enichem.

(3) 6.4% $CaCO_3$, (4) 1.86% ZnO, (5) 0.32% tetrakis(methylene(3,5-di-tert-butyl-4-hydroxyhydrocinnamate) methane, (6) 0.16% 4,4'-thio-bis-(6-tert-butyl-m-cresol), (7) 21.31% paraffin oil, (8) 1.49% 2,5-dimethyl-2,5-t-butyl-peroxyhexane, added as 50% active peroxide on clay, (9) 0.8% Struktol TR 016, a mixture of fatty acid salts and esters, commercially available from Struktol Company,

(10) 5.34% polybutadiene, added as 65% active polybutadiene on silica, and

(11) 1.07% zinc salt of mercaptobenzothiazole.

TABLE 1

| Component (A)(%) | Component (B)(%) | Compression Set Value | Qualitative Grain Retention |
|---|---|---|---|
| 90 | 10 | 90 | Poor |
| 80 | 20 | 87 | Fair–good |
| 70 | 30 | 85 | Good |
| 60 | 40 | 84 | Good |
| 50 | 50 | 75 | Good |
| 40 | 60 | 73 | Good |
| 30 | 70 | 65 | Fair–Poor |

The data show that when too much propylene polymer material (Component (A)) was present (>70%), grain retention was poor. When too much partially crosslinked thermoplastic olefin elastomer (Component (B)) was present (>60%), there was also inadequate grain retention.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A polyolefin composition comprising, by weight,
   (A) from 40 to 60% of a propylene polymer material consisting essentially of:
      (1) from 10 to 50% of a propylene homopolymer having an isotactic index, defined as the percent insoluble in xylene, of about 80 to about 99%, or a copolymer from monomers selected from the group consisting of (a) propylene and ethylene, (b) propylene, ethylene and a $CH_2=CHR$ alpha-olefin, where R is a 2–8 C straight or branched alkyl group, and (c) propylene and an alpha-olefin as defined above in (1)(b), the copolymer containing from 85 to 99% polymerized propylene and having an isotactic index, defined as the percent insoluble in xylene, greater than 80 to about 98%,
      (2) from 3 to 20% of an essentially linear copolymer from monomers selected from the group consisting of (a) ethylene and propylene containing over 50% polymerized ethylene; (b) ethylene, propylene, and an alpha-olefin as defined above in (1)(b) containing from 1 to 10% of the polymerized alpha-olefin and over 50% up to 98% of both polymerized ethylene and polymerized alpha-olefin; and (c) ethylene and an alpha-olefin as defined in (1)(b), containing over 50% up to 98% of the polymerized alpha-olefin, which copolymer is insoluble in xylene at room or ambient temperature, and
      (3) from 40 to 80% of a copolymer from monomers selected from the group consisting of (a) ethylene and propylene, wherein the copolymer contains from 20% to less than 40% polymerized ethylene; (b) ethylene, propylene, and an alpha-olefin as defined in (1)(b), wherein the polymerized alpha-olefin is present in an amount of from 1 to 10%, and the amount of polymerized ethylene and polymerized alpha-olefin present is from 20% to less than 40%; and (c) ethylene and an alpha-olefin as defined in (1)(b), containing from 20 to less than 40% of the polymerized alpha-olefin, and optionally containing 0.5 to 10% of a polymerized diene, the copolymer (3) being soluble in xylene at ambient temperature, and having an intrinsic viscosity measured in tetrahydronaphthalene at 135° C. of from 1.7 to 3.0 dl/g, wherein the total amount of (2) and (3), based on the total olefin polymer composition is from about 65% to 80%, the weight ratio of (2)/(3) is from 0.1 to about 0.3, and the total content of polymerized ethylene or polymerized 4–8 C alpha-olefin or combination thereof in (2)+(3) is less than 50%, and
   (B) from 60 to 40% of a partially crosslinked thermoplastic olefin elastomer composition having a gel content of at least 80% and not greater than 94% in cyclohexane and consisting essentially of:
      (1) 20–80 parts by weight of a thermoplastic elastomer consisting essentially of.
         (a) from 20 to 70% of propylene homopolymer having an isotactic index, defined as the percent insoluble in xylene, greater than 90, or a crystalline propylene copolymer from propylene and comonomers selected from the group consisting of (i) ethylene, (ii) a 4–8 C alpha-olefin and (iii) ethylene and a 4–8 C alpha-olefin, having a polymerized propylene content greater than 85% and an isotactic index, defined as the percent insoluble in xylene, of greater than 85%;
         (b) from 30 to 75% of an amorphous ethylene-propylene or ethylene-butene-1 copolymer, which is xylene soluble at room temperature and contains from 30 to 70% polymerized ethylene, and
         (c) from 3 to 30% of a semi-crystalline ethylene-propylene or ethylene-butene-1 copolymer that is xylene insoluble at room temperature and contains greater than 90% polymerized ethylene, and
      (2) 80-20 parts by weight of an ethylene/propylene/diene terpolymer rubber containing 1–10% polymerized diene and 30–70% polymerized ethylene.

2. The composition of claim 1, wherein the amount of component (B) is from 50 to 30%.

3. The composition of claim 1, wherein component (A)(1) is a propylene/ethylene copolymer, (A)(2) is an ethylene/propylene copolymer, and (A)(3) is an ethylene/propylene copolymer.

4. The composition of claim 1, wherein component (B)(1)(a) is a propylene homopolymer, (B)(1)(b) is an ethylene/propylene copolymer, and (B)(1)(c) is an ethylene (propylene copolymer.

* * * * *